UNITED STATES PATENT OFFICE.

JOSEPH A. SHINN, OF PITTSBURG, ASSIGNOR OF ONE-HALF TO JOHN K. SHINN, OF NEW CASTLE, PENNSYLVANIA.

MORTAR AND BUILDING COMPOSITION.

SPECIFICATION forming part of Letters Patent No. 280,679, dated July 3, 1883.

Application filed October 9, 1882. (No specimens.)

*To all whom it may concern:*

Be it known that I, JOSEPH A. SHINN, of Pittsburg, in the county of Allegheny and State of Pennsylvania, have invented certain new and useful Improvements in Mortar and Building Composition; and I do hereby declare that the following is a full, clear, and exact description of the invention, which will enable others skilled in the art to which it appertains to make and use the same.

This invention relates to a composition of material for use in various constructions as mortar, concrete, and artificial stone or building-blocks; and it consists in a mortar having a body of pulverized ashes and a matrix of fat-lime cement, plaster, or hydraulic lime, in the proportions of about eighty to ninety per cent. of the former to ten to twenty per cent. of either of the latter.

In making mortar after my invention I take from eighty to ninety per cent. of the waste ashes of coal finely divided or pulverized as the body, and to this add ten to twenty per cent. of fat-lime as the matrix. The ashes and lime are mixed in a finely-divided state with water sufficient for the purpose intended. The relative proportions of the foregoing ingredients within the limits named will be determined by the use intended and by the experience and judgment of the person using, the rule being to use as little lime as will produce the effect desired.

Instead of fat-lime, hydraulic lime, cement, or plaster may be substituted, according to the object to be arrived at.

By the term "ashes" herein used is meant the ash which is the residue of the combustion of coal. As the ordinary forms of furnaces are not always successful in effecting perfect combustion, I find that in most cases the ash which I require is accompanied by particles of coke and partially-burned coal. These are incidental products, and may be removed by screening, as they are not the valuable material I want, and which I term "ashes." When the particles of coke or cinder and coal are removed, the mortar is very fine in quality, and, if not removed, they simply change the grade, as they are not destructive of the qualities possessed by the above composition of ashes and lime. The ashes and lime are mingled with sufficient water and mixed until a paste is produced, which is then thinned with water until the desired consistency is obtained. The resulting mortar hardens somewhat more quickly than ordinary sand mortar, is more tenacious than and is as easily handled and used as sand mortar, is not affected by changes of temperature nor by dampness in the atmosphere.

For concrete I take the foregoing composition of lime and ashes and mix with it such material as broken stone, gravel, brick, cinder, or slag in the usual manner, and I obtain similar advantages as to strength and ease of use. Artificial stone or brick will be made the same as concrete, but shaped in molds. I find that greater tenacity results from the use of the ashes of anthracite coal, and I therefore prefer its use.

The composition above set forth may be successfully applied to mortar, bricks, tiles, paving for sidewalks and roadways, inside surfacing-plaster, building-blocks, artificial stone, architectural trimmings, &c.

I am aware that a mixture of coal-ashes with lime is not broadly new; but hitherto the proportion of ashes proposed has been comparatively small. I aim at the greatest possible utilization of ashes with the smallest proportion of lime, or its equivalent, and thereby effect not only the production of a very cheap composition, but one as efficient as the best sand mortar, and in some cases greatly superior thereto.

I claim as my invention—

The herein-described building or structural composition, consisting of a body of coal-ashes and a matrix of lime, (or its designated equivalent,) in the proportions of eighty to ninety per cent. of the former and twenty to ten per cent. of the latter.

In testimony that I claim the foregoing as my own I have hereto affixed my signature in presence of two witnesses.

JOSEPH A. SHINN.

Witnesses:
H. M. GESCHEIDT,
JACOB A. MITTNACHT.